3,597,225
GALLATE-CONTAINING LIQUID SHORTENING
FOR USE IN CAKE PREPARATION AND CAKE
MIX CONTAINING THE SAME
Donald H. Hughes, Green Township, Hamilton County,
Ohio, assignor to The Procter & Gamble Company,
Cincinnati, Ohio
No Drawing. Filed Feb. 25, 1969, Ser. No. 802,252
Int. Cl. A23d *5/00;* A21d *13/08*
U.S. Cl. 99—94
7 Claims

ABSTRACT OF THE DISCLOSURE

Alkyl gallate high temperature batter stabilizers are used in combination with liquid glyceride oil shortenings and alpha-phase crystal-tending emulsifiers as ingredients in cake preparation to provide cakes of improved volume, texture, and eating quality. A cake mix containing these ingredients provides these same benefits.

BACKGROUND OF THE INVENTION

This invention relates to novel liquid shortening compositions containing particular combinations of emulsifiers. These shortening compositions when utilized as ingredients in cake preparation provide a cake of improved volume, finer grain structure, and more tender eating quality. This invention further relates to a novel cake mix composition containing these shortening compositions; cakes prepared from these cake mixes have the above-described advantages.

It is known in the prior art that two types of emulsifiers are useful as additives to shortenings for cake preparation. One of these types of emulsifiers has been termed an "alpha-phase crystal-tending emulsifier"; the other type has been termed a "high temperature batter stabilizer." The alpha-phase crystal-tending emulsifiers have been found to have the function of increasing the tendency of cake batter to incorporate air during batter mixing. The high temperature batter stabilizers have been found to stabilize the cake batter against component separation during baking and to stabilize especially the foamy consistency and increased volume of the batter resulting from air incorporation during batter mixing. Preferably, the two types of emulsifiers have been utilized together.

The use of shortenings containing these additives in cake preparation has been found to reduce the number of mixing stages required to incorporate air into the cake batter, to stabilize the batter during baking, and to produce baked cakes of increased volume, fine grain structure, and more tender eating quality. The combination of these two types of emulsifiers with shortenings and the use of the resulting compositions in cake preparation is described in U.S. Pats. 3,145,107; 3,145,108; and 3,145,109.

SUMMARY OF THE INVENTION

It has now been disovered that particular alkyl gallates function as high temperature batter stabilizers when liquid shortening compositions containing these alkyl gallates and in addition alpha-phase crystal-tending emulsifiers are utilized in cake production. In accordance with this discovery, there is provided in this invention a novel shortening composition comprising liquid glyceride oil shortening, alkyl gallate as a high temperature batter stabilizer, and alpha-phase crystal-tending emulsifier. This novel shortening composition when utilized as an ingredient in cake preparation produces cakes of high volume, fine grain structure, and very tender eating quality. If in this shortening composition a plastic or solid shortening is utilized instead of a liquid glyceride oil shortening, or if either the alkyl gallate ingredient or the alpha-phase crystal-tending emulsifier ingredient is left out, these benefits are not achieved. Moreover, in accordance with the above-described discovery, there is provided in this invention a novel cake mix which contains the above-described shortening composition and which produces cakes with the above-described benefits.

The prior art is known to show the use of alkyl gallates as antioxidants in fats for pie crusts and cake mixes. In this regard see Morris et al., 24 J. Amer. Oil Chem. Society 309–311 (1947); Tollenaar et al., 35 J. Amer. Oil Chem. Society 448–455 (1958); Van Esch, 16 Voeding 683–6 (1955), 54 Chemical Abstracts 1764 (1960); and Tollenaar et al., 58 Fette-Sifen-Anstricmittel 112–118 (1956), 50 Chemical Abstracts 9639 (1956). However, no prior art reference is known to disclose that alkyl gallates function as high temperature batter stabilizers. More particularly, no prior art reference is known to disclose alkyl gallates in combination with alpha-phase crystal-tending emulsifiers and liquid glyceride oil shortenings or that this combination when utilized in cake production or in cake mixes provides cakes with the above-described benefits.

DETAILED DESCRIPTION OF THE INVENTION

The novel shortening composition of this invention comprises liquid glyceride oil shortening, from about 0.25% to about 4% by weight of the total composition of alkyl gallate, and from about 0.5% to about 15%, by weight of the total composition, of alpha-phase crystal-tending emulsifier. Preferably the shortening composition comprises by weight of the total composition of from about 0.5% to about 3% of alkyl gallate.

Liquid glyceride oil shortenings useful herein are edible and should consist primarily of triglycerides. They can be derived from any of the naturally-occurring liquid glyceride oils such as soybean oil, cottonseed oil, peanut oil, rapeseed oil, sesame seed oil, and sunflower seed oil. Also suitable are edible liquid oil fractions obtained from palm oil, lard, and tallow, as, for evample, by graining or directed interesterification, followed by separation of the oil. The liquid glyceride oil shortening can be a non-hydrogenated oil, a hydrogenated oil, or a combination of the two. Oils containing high levels of linolenic acid, for example, oils having acid moieties expressed as acids containing more than about 3%, by weight, of linolenic acid moieties expressed as acids, ordinarily are selectively hydrogenated by conventional methods to reduce the level of linolenic acids to less than about the 3% level; this is because oils wherein this level of linolenic acid moieties is exceeded can be subject to rancidity. Partially hydrogenated oils can be winterized to assure continued liquidity.

Alkyl gallates useful herein have the formula:

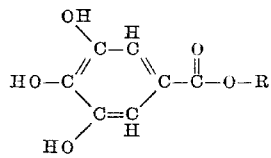

wherein R is an alkyl group having from about 14 to about 22 carbon atoms. Octadecyl gallate, that is, the compound having the above structural formula wherein R is an alkyl group having 18 carbon atoms, is preferred. Other suitable alkyl gallates include, for example, tetradecyl gallate, pentadecyl gallate, hexadecyl gallate, and docosyl gallate. These alkyl gallates are conveniently prepared by reaction of equal molar quantities of fatty alcohol and gallic acid in the presence of an acidic catalyst such as sulfuric acid or p-toluene sulfonic acid with the aid of an effective mutual solvent such as a 1:1 mixture by volume of xylene and tetraethylene glycol dimethyl ether; the reaction can be carried out by heating to a temperature giving refluxing of the solvent and resulting in evolution of moisture which is separated, for example, in a moisture trap.

The alpha-phase crystal-tending emulsifiers useful herein are to be distinguished from fatty materials having predominantly beta or beta-prime crystal-tending phases. These types of crystalline structures can be identified by their X-ray diffraction patterns and are described in an article by E. S. Lutton in the Journal of the American Chemical Society, vol. 67, page 524 (1945), and in Mitchell, U.S. Pats. 2,521,241–2, granted Sept. 5, 1950. The alpha crystalline form is the least stable, least dense, and lowest melting of these crystalline forms. The alpha-phase crystal-tending emulsifiers used in this invention are both lipophilic and hydrophilic and contain in the molecule at least one higher fatty acid group having from about 12 to about 22 carbon atoms and at least one free and unesterified hydroxyl group.

Among the alpha-phase crystal-tending emulsifiers which can be used in the practice of this invention are the following classes of materials:

(a) A monoester of a straight chain aliphatic diol with a saturated fatty acid, said diol containing from 3 to 5 carbon atoms and said saturated fatty acid having from about 12 to about 22 carbon atoms, such as propylene glycol monostearate;

(b) A condensation product of a monohydroxy-monocarboxylic acid having from 2 to 6 carbon atoms with a partial fatty acid glyceride containing an average of from 1 to 2 fatty acid radicals having from about 12 to about 22 carbon atoms, such as monoglyceridyl lactate or lactostearin;

(c) A 1,3-diglyceride containing a saturated fatty acid having from about 16 to about 22 carbon atoms and a saturated fatty acid having from 2 to 4 carbon atoms, such as 1-acetyl-3-monostearin;

(d) A 1,2-diglyceride containing a saturated fatty acid having from about 16 to about 22 carbon atoms and a saturated fatty acid having from about 12 to about 18 carbon atoms, such as 1,2-distearin; and (e) A fatty acid monoester of diethylene glycol, said fatty acid having from about 12 to about 22 carbon atoms, such as diethylene glycol monostearate.

Novel shortening compositions of this invention are conveniently prepared, for example, by admixing the alkyl gallate and alpha-phase crystal-tending emulsifiers together with the liquid glyceride oil shortening constituent in amounts sufficient to provide a composition with the above-described required percentages of ingredients. If either the alkyl gallate constituent or the alpha-phase crystal-tending emulsifier constituent is normally solid, the constituents should be heated to a temperature level sufficient for them to be in their liquid form during admixing.

The novel shortening composition herein can be used in any cake preparation process in place of the shortening constituent therein. When so used it provides the previously described benefits of high cake volume, fine grain structure, and tender eating quality.

The novel shortening composition herein is especially useful as the shortening constituent in a prepared dry cake mix and when so used provides a novel prepared cake mix. In mixes of this type, dry ingredients are combined in proper proportions and the mixes are then packaged. Liquid materials, such as water, milk, and/or eggs, are added to the mix to prepare a batter for use in baking. By utilization of these mixes, one of the problems in baking, variation in ingredients, has been eliminated to a large degree.

Examples of such dry cake mixes are white, chocolate, yellow, spice, and other such cake mixes, comprising by weight, for example, from about 10% to about 25% of the novel shortening composition of this invention, from about 30% to about 50% sugar, and from about 30% to about 50% of any amylaceous substance, such as flour, especially cake flour, or starch. Optional additional ingredients include proteinaceous substances, for example, nonfat milk solids or dried egg whites, leavening agents such as double-acting baking powder, salt, and flavorings such as vanilla or cocoa.

These cake mixes can be conveniently prepared, for example, by the method described in Mills U.S. Pat. 2,874,053. In the Mills method the mix can be prepared by forming a homogeneous blend containing sugar, flour and shortening, thereafter subjecting this blend to a roll milling operation and then adding and blending in any other ingredient. Another very excellent method for preparing these cake mixes is described in Cooke U.S. application Ser. No. 759,795, filed Sept. 13, 1968. In the Cooke process, cake mixes are prepared by first co-milling sugar and flour by passing them through a multi-impact mill and then blending shortening into the resulting co-milled mixture.

Prepared dry cake mixes within the scope of this invention when admixed with water, milk, and/or eggs produce a batter which when baked provides a cake with the abovedescribed volume, texture and eating quality benefits.

The following examples further illustrate the preparation of the alkyl gallate high temperature batter stabilizers useful herein. They also further illustrate the novel shortening compositions of this invention, their preparation, their use in cake preparation, and the benefits they provide. Moreover, Example 2 hereinafter further illustrates a novel white cake mix of this invention, its preparation, and the benefits it provides. In these examples all percentages are by weight.

EXAMPLE 1

Octadecyl gallate high temperature batter stabiilzer is prepared as follows: Gallic acid (42 grams, 0.247 mole) and octadecanol (77 grams, 0.285 mole) are reacted in the presence of p-toluene sulfonic acid monohydrate in a solvent consisting of 100 ml. of xylene and 100 ml. of tetraethylene glycol ether. The reaction is carried out in a 500 ml. 3-neck flask equipped with a stirrer and moisture trap. The reaction is carried out at reflux temperature with stirring and effective refluxing for 6 hours. During the reaction 6.2 ml. of water are collected in the moisture trap. The product is diluted with 600 ml. of xylene, and the resulting solution is water washed three times. The washed organic layer is diluted with two liters of hexane and the resulting sample is maintained at 80° F. to allow crystals to form and precipitate. The precipitate is recovered by filtration, and then is dissolved in 200 ml. of benzene plus 800 ml. of hexane with warming. The resulting solution is cooled to 80° F. to allow crystals to form and precipitate. Filtration and vacuum drying of the crystals yields 51.7 grams of substantially pure octadecyl gallate.

A shortening composition is then prepared as follows: 0.5 gram of the octadecyl gallate prepared above, 14 grams of propylene glycol monostearate (an alpha-phase crystal-tending emulsifier) and 85.5 grams of refined and deodorized cotton seed oil are admixed in a jacketed stainless steel vessel. During this admixing process these constituents are maintained at 140° F. to 160° F. by passing steam through the vessel jacket. As a result of this heating, all of the constituents are converted to the liquid form during admixing. The resulting shortening composition is a solution wherein the octadecyl gallate and propylene glycol monostearate are dissolved in the cottonseed oil. It is liquid in form. It contains by weight 0.5% octadecyl gallate, 14% propylene glycol monostearate, and the remainder being cottonseed oil.

White cakes are then prepared utilizing the above-prepared shortening composition. These cakes are prepared from the following ingredients.

| Ingredients: | Parts by wt., grams |
|---|---|
| Granulated sugar | 206 |
| Cake flour | 203 |
| Shortening (described above) | 57 |
| Dextrose | 16.8 |
| Nonfat milk solids | 24.4 |
| Salt | 4 |
| Double-acting baking powder | 7.5 |
| Vanilla | 1.3 |
| Egg whites, fresh | 60 |

The shortening and egg whites are added to a mixture of the rest of the ingredients and then 300 ml. of water is mixed in with an electric mixer at 500 r.p.m. for 4 minutes to provide a batter. 400 grams of batter is placed in an 8-inch round pan and baked at 360° F. for about 25 minutes. The cake volume 20 minutes after removal of the cake from the oven is 1930 cc./400 g. batter. The cake has a fine grain structure and a very tender eating quality.

Similar results of improved volume, fine grain structure, and very tender eating quality are achieved when in the third paragraph of this example other liquid oils, for example, soybean oil hydrogenated to an iodine value of 107, are substituted for the cottonseed oil utilized there, or when other alkyl gallates, for example, hexadecyl gallate, are substituted for the octadecyl gallate used there, or when starch is substituted for part or all of the flour utilized there; or when other alpha-phase crystal-tending emulsifiers, for example, diethylene glycol monostearate, 1 - acetyl - 3 - monostearin, 1,2-distearin or lactostearin are substituted for the propylene glycol monostearate utilized there.

In another case, white cake is prepared as in the third paragraph of this example except that the shortening does not contain any octadecyl gallate but only cottonseed oil and propylene glycol monostearate. The cake volume 20 minutes after removal of the cake from the oven is approximately 1000 cc./400 g. of batter. The cake has a significantly tougher eating quality than the cake made above utilizing the shortening compositions containing octadecyl gallate. Moreover, low volume, poor grain structure, and tough eating quality results are obtained when shortening containing 0.5% octadecyl gallate and no propylene glycol monostearate or other alpha-phase crystal-tending emulsifier is utilized. These poor results are also obtained when a commercially available plastic shortening derived from hydrogenated soybean oil is utilized instead of the liquid cottonseed oil utilized above.

EXAMPLE 2

A dry cake mix for producing white cake is prepared utilizing the following formula:

| Ingredient: | Wt. percent |
|---|---|
| Sugar | 44.3 |
| Flour | 35.4 |
| Shortening [1] | 15.0 |
| Milk solids | 2.5 |
| Salt | 1 |
| Soda | 0.7 |
| Monocalcium phosphate | 0.5 |
| Sodium acid pyrophosphate | 0.6 |

[1] The shortening contains .05% octadecyl gallate, 14% propylene glycol monostearate, each by weight, and the remainder refined and deodorized cottonseed oil.

The cake mix is prepared by thoroughly mixing the sugar, flour and shortening and then milling by passing through a 3-roll mill, the first and second rolls having speed ratios of 3:1, and the second and third rolls having ratios of 2:1. Two passes through the mill are made. After milling, the other ingredients are added and thoroughly blended in and the mixture finally passed through an impact grinder.

Cakes of superior volume, fine grain structure, and tender eating quality can be made from this mix by adding two eggs and about one cup of water to 20 ounces of mix, beating for two minutes, and baking for about 25 minutes at 360° F.

I claim:
1. A shortening composition comprising a liquid glyceride oil shortening, from about 0.5% to about 15% by weight of an alpha-phase crystal-tending emulsifier, and from about 0.25% to about 4% by weight of an alkyl gallate having the formula:

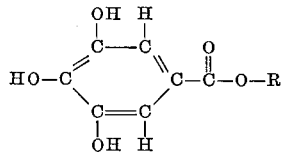

wherein R is an alkyl group having from about 14 to about 22 carbon atoms.

2. The shortening composition of claim 1 wherein the alkyl gallate is about 0.5% to about 3% by weight of the total composition.

3. The shortening composition of claim 2 wherein the alkyl gallate is octadecyl gallate, that is wherein in the structural formula R is an alkyl group having 18 carbon atoms.

4. The shortening composition of claim 3 wherein the alpha-phase crystal-tending emulsifier is propylene glycol monostearate.

5. A dry cake mix comprising by weight from about 10% to about 25% of the shortening composition of claim 1, from about 30% to about 50% sugar, and from about 30% to about 50% of an amylaceous substance.

6. The dry cake mix of claim 5 wherein the amylaceous substance is cake flour.

7. The dry cake mix of claim 6 wherein the alkyl gallate in the shortening composition is octadecyl gallate and the alpha-phase crystal tending emulsifier in the shortening composition is propylene glycol monostearate.

References Cited

UNITED STATES PATENTS

| 3,145,107 | 8/1964 | Howard | 99—118 |
| 3,145,108 | 8/1964 | Howard | 99—118 |
| 3,145,109 | 8/1964 | Howard | 99—118 |

JOSEPH M. GOLIAN, Primary Examiner

U.S. Cl. X.R.

99—92, 118